UNITED STATES PATENT OFFICE

2,628,211

POLYVINYL CHLORIDE RESINS STABILIZED WITH POLYSTANNOXANEDIOL ESTERS

Gerry P. Mack, Jackson Heights, and Emery Parker, New York, N. Y., assignors to Advance Solvents & Chemical Corporation, New York, N. Y.

No Drawing. Application December 10, 1949, Serial No. 132,406

9 Claims. (Cl. 260—45.75)

The invention relates to stabilized halogen-containing resins and compositions containing the same.

It is well known that halogen-containing resins, particularly vinyl chloride resins and resins formed by conjoint polymerization of vinyl chloride with vinyl acetate or other unsaturated compounds polymerizable therewith, are liable to discoloration when subjected to elevated temperatures during or after compounding and also under the influence of prolonged exposure to light. A great number of stabilizers have been proposed for preventing or retarding such discoloration, also organo-tin compounds of which the effectiveness is generally attributed to their ability of binding the hydrochloric acid liberated during the decomposition of the resin.

However, the attempts of taking advantage of the stabilizing properties of organo-tin compounds have met with considerable difficulties due to the fact that the organo-tin compounds available heretofore for this purpose have certain objectionable properties which reduce their value as stabilizer and affect the quality of the finished resin and articles made thereof in various respects.

Many of said organo-tin compounds which are compatible with polyvinyl chloride compositions have such a high vapor pressure that when employed at the usual processing temperatures of 300–350° F. much of the stabilizer will volatize off and be lost. These stabilizers will therefore give a varying degree of stabilization depending on the temperature of the mill and on the operating conditions. This volatilization will continue during the calendering or extruding, so that eventually only a small amount of the original stabilizer will be present.

A further drawback of such volatile alkyl tin compounds employed as stabilizers is that their volatilization during processing causes ill effects on the health of the workmen working around the machinery and makes the work very disagreeable.

A particular disadvantage of many organo-tin compounds which would otherwise be satisfactory stabilizers is their instability to moisture and air which they often maintain even when incorporated in the resins. Therefore, their presence in resins increases the water sensitivity thereof and it is difficult to store and ship such stabilizers unless they are kept under vacuum, which is of course not feasible. It is known that such compounds immediately upon exposure to air will start changing and that they hydrolyze even under relatively low humidity forming copious precipitates; such precipitates are very difficult to disperse in vinyl resins and give opaqueness to the films rather than the clarity and transparency so much desired in using the tin compounds as stabilizers.

Another drawback of the known stabilizers is that they are frequently not compatible with certain plasticizers used in the compounding of vinyl resins.

It is an object of this invention to provide halogen-containing resinous compositions stabilized with organo-tin compounds which have a low vapor pressure and are stable against moisture, and which prevent discoloration and haziness of the resin during the processing as well as in the finished product, such as film, sheets, or molded articles, when exposed to heat and light.

Other objects and advantages will be apparent from a consideration of the specification and claims.

According to this invention we use as stabilizers derivatives of polystannanediols in which at least one, but preferably both, of the terminal hydroxyl groups is substituted by an organic group which renders the compound compatible with halogen-containing resins.

Polystannanediols are compounds consisting of a plurality of $R_2SnO$ groups which are linked to each other through the oxygen atoms and wherein the two free terminal valences are taken up by hydroxyl groups. They may be represented either by an open chain formula

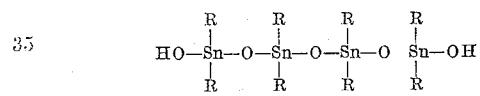

or by a corresponding closed chain formula wherein R is alkyl or aryl.

In our co-pending application, Serial No. 57,425, filed October 29, 1948, we have disclosed and claimed halogen-containing resins stabilized with organo-tin polymers comprising in their structure $R_2SnO$ units linked to each other through the oxygen atoms, specifically with polystannanediol ethers which are obtained, for instance, by the polymerization of monomeric organo-tin dialkoxides. This invention is concerned essentially with polystannanediol esters, i. e. with polystannanediols in which one or both terminal hydroxyl groups are substituted by carboxylic acid radicals.

Such esters may be obtained by the esterification of polystannanediols, by dissolving organo-tin oxides in carboxylic acids with subsequent neutralization, or by reacting polystannanediols with aliphatic or aromatic esters. The most convenient method for obtaining the diesters consists in polymerizing monomeric organo-tin salts of monocarboxylic acids; monoesters may be obtained by partial saponification of the diester. This polymerization is preferably brought about by a simple heat treatment in the presence of moisture as a catalyzing agent. However, chemical catalysts may also be used, for instance moisture absorbing organic compounds such as mono or dihydric alcohols. When preparing the stabilizers by the polymerization of monomeric salts, there is obtained a series or mixture of polymers having various degrees of polymerization depending on the nature of the carboxylic acids, the length of treatment, temperature, and other factors involved.

The physical state of the polystannanediol esters is a function of their molecular weight and the particular ester-forming carboxylic acid. The lower weight polymers are mostly viscous liquids and the higher polymers waxy solids. They are soluble in conventional organic solvents, such as alcohols, esters, aromatic hydrocarbons, and the like, and can be freed from insoluble organo-tin oxides and purified by recrystallization from these solvents.

We have found that polymers having up to 12 $R_2SnO$ groups are readily soluble and fully compatible with vinyl resins, and we use them as stabilizers in such amounts that 0.1 to 5 per cent, preferably 0.3 to 3 per cent, of tin by weight of the halogen-containing resin are employed. The esters may also be used in combination with other organo-tin or tin-free stabilizers. The polymer may be added prior, during, or after polymerization of the halogen-containing compound and is preferably incorporated in the polymerized product before compounding it in the rubber mill.

The ester group of the polystannanediol esters is preferably derived from aliphatic monocarboxylic saturated or unsaturated acids, such as formic, acetic, propionic, butyric, 2-ethyl butyric, 2-ethylhexoic, nonanoic, lauric, acrylic, crotonic, sorbic, naphthenic acid, and other acids having 1 to 12 carbon atoms. Aliphatic dicarboxylic acids and aromatic acids may also be used.

The R group in the above given formula may be, for instance, methyl, ethyl, propyl, isopropyl, butyl, tert. butyl, isobutyl, amyl, hexyl, 2-ethylhexyl, lauryl, or aromatic groups such as phenyl, tolyl, xylyl, or benzyl.

As stated hereinabove, the polystannanediol esters may be obtained by the polymerization of monomeric organo-tin salts of carboxylic acids. Such monomeric salts have been proposed as stabilizers for vinyl resins, but in commercial use they have proved to have serious drawbacks.

The organo-tin salts of lower aliphatic acids, for instance dibutyl tin diacetate, are very volatile already at temperatures above 300° F. During compounding with vinyl halide polymers they break down and give off very strong acetic acid fumes, which at these high temperatures are very objectionable to the workmen. Also, the strong odor of acetic acid is carried through to the finished compound or film and this too is objectionable.

The same objection is true of organic tin compounds of medium molecular weight carboxylic acids, such as butyric, valeric, caproic and similar acids, which transmit their strong objectionable odors to the finished stabilized products.

Another disadvantage of the organo-tin salts of lower aliphatic acids is that they are somewhat soluble in water and hydrolyze in the presence of water. Dibutyl tin diacetate, for instance, will slowly decompose to acetic acid and dibutyl tin oxide. This sensitivity to water makes these stabilizers unsuitable for application in vinyl films exposed to water and humidity. For the same reason, the organo-tin salts of lower aliphatic acids cannot be used as stabilizers in the recently developed vinyl halide latices, because they immediately hydrolyze upon contact with water forming tin salts, which react with the usual ionic type emulsifier used in producing vinyl emulsions and thus destroy or coagulate the emulsion.

To overcome the disadvantages inherent in the use of organo-tin salts of the lower aliphatic acids, particularly the acetate, it has been proposed to use organo-tin salts of the higher fatty acids such as the laurate. Though it is true that these compounds are less volatile than the corresponding salts of the lower aliphatic acids, they have a number of other drawbacks.

It is well known that higher fatty acids when exposed to higher temperatures have a tendency to yellow, and it appears that the organo-tin derivatives maintain this tendency. When, for instance, vinyl chloride resins stabilized with dibutyl tin dilaurate are processed for any length of time, the films become somewhat yellow, which has been attributed to the laurate radical.

A further drawback of the organo-tin salts of higher fatty acids is that with increasing length of the carboxylic acid chain the compatibility of the salts with vinyl halide resins is decreased. If, for instance, dibutyl tin dilaurate is used in amounts of more than 2-3 per cent, it has the tendency to exude or sweat out, giving an oily or greasy film. This sweating out or blooming in the vinyl films is very objectionable for many reasons and is particularly objectionable since these films when they have an exudation will not heat seal or will give a very poor heat seal due to the blooming of the stabilizer. Further, in the case of printing such films, where articles of the type of shower curtains, table cloths and other decorative items are contemplated, the exudations will interfere with the printing process and prevent good adhesion of the printing inks to the vinyl film itself.

The incompatibility of the organo-tin salts of higher fatty acids with vinyl halide resins has the further undesirable result that films prepared from such stabilized resin show a slight haze instead of the clarity desirable in such films.

Organo-tin salts of dicarboxylic acids are somewhat water soluble; they increase the water sensitivity of the resins into which they are incorporated and have, in this particular, the same disadvantages as outlined with respect to the organo-tin salts of the lower aliphatic acids.

The hydrolysis of the monomeric organo-tin salt stabilizers within the resin is further objectionable because the free acids split off by hydrolysis impair the ageing properties of the resin; in the presence of free acids, films made of vinyl chloride resins turn yellow on standing.

The recited drawbacks inherent in the use of monomeric organo-tin salts of carboxylic acid as stabilizers, i. e. either their volatility or their sensitivity to moisture, or the evolution of obnoxious acidic fumes during compounding and the carrying over of the acidic smell to the manufactured goods are eliminated or substantially reduced by the use of the polymeric compounds according to the invention, as stabilizers which are much less sensitive to moisture than the corresponding monomeric components. The compatibility of these polymeric stabilizers with the resins and plasticizers is increased over the monomers and no sweating out takes place which would influence the surface or heat-sealing properties of the films or coatings made with the stabilized resins.

Halogen-containing resins, which are made heat and light resistant by the stabilizers of this invention, include polymers of vinyl chloride and vinyl resins containing vinyl chloride units in their structure, such as copolymers of vinyl chloride with vinyl esters of aliphatic acids, particularly vinyl acetate; copolymers of vinyl chloride with esters of acrylic and methacrylic acids, and with acrylonitrile; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; polymers of vinylidene chloride and copolymers of the same with vinyl chloride and other polymerizable compounds; polymers of vinyl chloroacetate and dichlordivinyl ether; chlorinated polymers of vinyl acetate; chlorinated polymeric esters of acrylic and alpha-substituted acrylic acids; polymers of chlorinated styrenes, for instance dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides are equally well stabilized.

The following examples will serve to illustrate the invention.

*Example 1*

Monomeric dibutyl tin diacetate was prepared either by heating 1 mole of dibutyl tin oxide with 2 moles of acetic acid or by reacting dibutyl tin dichloride with sodium acetate in aqueous solution.

If the monomeric diacetate was subjected to vacuum distillation at 134–136° C. at 5 mm. pressure, a small amount of dibutyl tin diacetate and acetic acid were distilled off and an undistillable residue was obtained which was completely soluble in such solvents as cold ethyl alcohol and toluene. On analysis, this residue proved to be substantially a dimeric dibutyl tin diacetate, which may also be defined as the acetic ester of the anhydrobisdibutyl stannanediol of the formula $$\text{CH}_3\text{COO}-\underset{\underset{\text{C}_4\text{H}_9}{|}}{\overset{\overset{\text{C}_4\text{H}_9}{|}}{\text{Sn}}}-\text{O}-\underset{\underset{\text{C}_4\text{H}_9}{|}}{\overset{\overset{\text{C}_4\text{H}_9}{|}}{\text{Sn}}}-\text{OOCCH}_3$$

If the distillation was carried out in the presence of steam at temperatures of 95–100° C., a trimer was obtained which can be represented by the formula

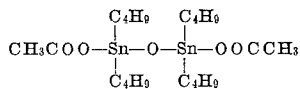

and may be defined as the diacetate of dianhydrotrisdibutyl stannanediol.

When under similar conditions moist air was blown through the monomeric diacetate at 140° C., we obtained after a treatment of six hours a residue corresponding substantially to the tetramer and after 24 hours a heptamer of the molecular formula

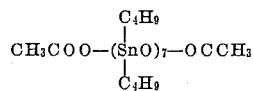

This heptamer was a waxy solid which was difficultly soluble in ethyl alcohol but readily soluble in toluene. It melted unsharp at 132–136° C.

It should be noted that it is not possible by chemical analysis to decide whether the tested compounds correspond sharply to the indicated polymerization degrees or constitute a mixture of polymers having various degrees of polymerization of which the indicated degree defines the mean value. For practical purposes it is immaterial whether the compounds are pure polymers or polymer mixtures; of importance is only that they neither contain substantial amounts of monomers, which would impart to the resins the undesired properties recited hereabove, nor organo-tin oxides which are insoluble in the solvents for the polymers.

*Example 2*

The preparation of the polymeric dibutyl tin diacetate according to the preceding example is representative of the preparation of compounds of other acids. For instance, when dibutyl tin dipropionate was heated at 140° C. and moist air was blown through for 5 hours and for 24 hours respectively, in the first case a solid trimer of the molecular formula

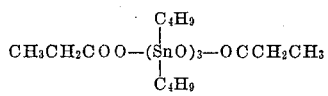

was obtained which was completely soluble in cold ethanol.

In the second case, a waxy decamer of the molecular formula

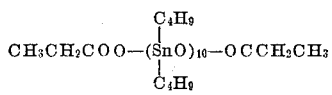

was obtained which was not soluble in ethanol but readily soluble in warm toluene.

*Example 3*

Dibutyl tin di(2-ethylhexoate) of the formula

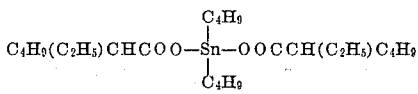

was subjected in the manner described above to a heat treatment with moist air under reduced pressure at 140° C. and 165° C. for 24 hours.

In the first case a polymer containing 31.9 per cent of tin and 36.6 per cent of 2-ethylhexoic acid corresponding substantially to the dimer, and in the second case a polymer containing 38.2 per cent of tin and 22.08 per cent of 2-ethylhexoic acid corresponding substantially to the tetramer were obtained. Both polymers were readily soluble in ethanol.

*Example 4*

Two identical resin mixes were prepared, each containing 65 parts of a vinyl chloride-vinyl acetate copolymer resin containing 95 per cent of vinyl chloride and 5 per cent of vinyl acetate, and 35 parts of 2-ethylhexyl phthalate.

Both mixes were milled on a rubber mill for ten minutes at 310–320° F., the first sample being incorporated with 1.5 parts of a monomeric dibutyl tin diacetate, the second sample with one part of the solid heptamer, i. e. with the diacetate of hexa - anhydro - heptakis-dibutylstannanediol as prepared according to Example 1.

In the first sample, the evolution of acid fumes was very annoying and caused irritation to the eyes and skin whereas in the processing of the second sample no acid fumes were developed and the milling operation did not require any special precautions for the protection of the operator.

The milled sheets were heat pressed for five minutes between polished steel plates to a film of $\frac{1}{32}$" thickness and then baked in an air circulating oven at 340–350° F. for various lengths of time.

The samples containing the heptamer stood up for a longer time and showed less discoloration than the monomer samples. The same was true when the samples were exposed in an Atlas fadeometer to ultraviolet light.

A particular superiority was shown by the sheets containing the heptamer insofar as they were odorless, whereas the sheets containing the monomer stabilizer had a distinct acidic odor even after baking.

*Example 5*

1 gram of the decameric dibutyl tin dipropionate as obtained according to Example 2, 64 grams of vinyl chloride resin and 35 grams of dioctyl phthalate were milled continuously for 45 minutes at about 325° F. on a rubber mill. The milling presented no difficulty and no obnoxious fumes harmful to the operator were observed.

The film so obtained was compared with a film prepared in an identical manner but using a monomeric dibutyl tin dipropionate by measuring the extinction coefficients of both sheets in a spectrophotometer using a light source of 5000 Angstrom units wave length. As the extinction coefficient is a direct measure for the light transmission of a plastic film—the lower the extinction coefficient the higher the light transmission—it gives reliable comparative values. It was found that the film containing the polymeric dibutyl tin propionate had a considerably lower extinction coefficient and the results of the tests are shown in the following table.

|  | Extinction coefficients after— | | |
|---|---|---|---|
|  | 5 min. | 30 min. | 45 min. |
| Monomeric dibutyl tin dipropionate | 0.5 | 1.4 | 2.0 |
| Decameric dibutyl tin dipropionate | 0.3 | 0.5 | 0.7 |
| No stabilizer | 0.9 | 2.9 | 5.6 |

During milling of the film containing the monomeric dibutyl tin dipropionate a strong odor of propionic acid was noticeable, which odor was carried through to the baked sheet.

*Example 6*

1.5 grams of the tetrameric dibutyl tin di(2-ethylhexoate) as obtained according to Example 3 were incorporated in a mixture of 100 grams of a vinyl chloride-diethyl maleate copolymer resin, 35 grams of dioctyl phthalate and 15 grams of diphenyl octyl phosphate. The mix was fluxed on a rubber mill for ten minutes at 325° F., then heat pressed for five minutes. When the so obtained film was baked in an air circulating oven at 325° F. for thirty minutes no discoloration was observed and the film was clear and transparent, having no odor. An identical film containing 3 grams of monomeric dibutyl tin di(2-ethylhexoate) milled and baked in the same resin and plasticizer mix was discolored to a brownish yellow.

*Example 7*

31.7 grams of dibenzyl tin oxide were refluxed with an excess of benzyl acetate as described by Smith and Kipping, J. Chem. Soc. vol. 103, page 2047. The crystalline product obtained melted unsharp at 155–170° C. and corresponded substantially to the formula

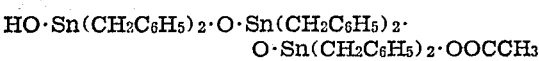

i. e. to dianhydrotrisdibenzyl stannanediol monoacetate. It was completely soluble in cold toluol. If 1 g. of this polymeric dibenzyl stannanediol monoacetate was added to 65 g. of a vinyl chloride-vinylidene chloride copolymer together with 35 g. of dioctyl phthalate, milled and sheeted out on a rubber mill at 325° F. for 30 minutes, the film obtained was completely transparent and had no yellow tint, whereas a film prepared in an identical manner containing the monomeric dibenzyl tin diacetate having a melting point of 136° C. had a yellow tint and a few brown specks indicating the volatilization of the stabilizer during milling.

The basic compounds referred to in the specification have been named differently by different investigators. For instance, compounds of the general formula

have been designated as anhydropolystannanediols, which expression was intended to bring out the fact that the compounds involved are polycondensation-products.

For the sake of clarity, I use in the claims a nomenclature confirming to the accepted nomenclature of the corresponding silicon compounds, where the term "siloxane" is used to designate $SiH_2O$ units, and polysiloxanediols are compounds of the formula $(HO)(SiH_2O)_nH$. Accordingly, the correct designation of tin compounds represented by the above formula would be hydrocarbon - substituted polystannoxane - alpha, omega-diols, and the compounds of this invention have to be designated as esters of hydrocarbon-substituted polystannoxane-alpha, omega-diols. This term is used in the claims.

Various modifications of the invention, other than specifically described herein, will be evident and are included within the scope of the appended claims.

What we claim is:

1. A heat and light resistant plastic composition including as a major constituent a halogen-containing resin and as a stabilizer an aliphatic carboxylic acid ester of a linear hydrocarbon-substituted polystannoxane-alpha, omega-diol.

2. A heat and light resistant plastic composition including as a major constituent a vinyl resin containing polymerized vinyl halide and as a stabilizer an aliphatic carboxylic acid ester of a linear hydrocarbon-substituted polystannoxane-alpha, omega-diol.

3. A heat and light resistant plastic composition including as a major constituent a vinyl chloride-vinyl acetate copolymer and as a stabilizer an aliphatic carboxylic acid ester of a linear hydrocarbon - substituted polystannoxane - alpha, omega-diol.

4. A thermally stable vinyl chloride resin composition including intimately dispersed therein a polymerized salt of a linear hydrocarbon-substituted stannoxane with an aliphatic carboxylic acid in an amount of 0.1 to 5 per cent by weight of tin based on the weight of the vinyl chloride.

5. A thermally stable vinyl chloride resin composition including intimately dispersed therein a polymerized organo-tin salt of a carboxylic acid in an amount of 0.1 to 5 per cent by weight of tin based on the weight of the vinyl chloride, said salt having the formula $$R^1—(SnR_2O)_n—SnR_2R^2$$

wherein R is a monovalent hydrocarbon radical, $R^1$ is the radical of an aliphatic carboxylic acid, $R^2$ is a member of the group consisting of hydroxyl and $R^1$, and $n$ is a numeral from 1 to 11.

6. A thermally stable vinyl chloride resin composition including intimately dispersed therein the polymerized compound obtained by heating a monomeric dialkyl tin salt of an aliphatic monocarboxylic acid having not more than 12 carbon atoms at a temperature of at least 95° C. under reduced pressure in the presence of water vapor.

7. As a new composition of matter a mixture containing an organic halide plastic composition and an aliphatic carboxylic acid ester of a linear hydrocarbon-substituted polystannoxane-alpha, omega-diol in an amount of 0.1 to 5 per cent by weight of tin based on the weight of said organic halide.

8. A resin composition as defined in claim 5 wherein $R^1$ is the radical of an aliphatic monocarboxylic acid containing not more than 12 C atoms.

9. A heat and light resistant plastic composition including as a major constituent a halogen-containing resin and as a stabilizer a linear hydrocarbon - substituted polystannoxane - alpha, omega-diol ester in which at least one of the two terminal hydroxyl groups of said polystannoxane-alpha, omega-diol is substituted by the radical of an aliphatic carboxylic acid.

GERRY P. MACK.
EMERY PARKER.

No references cited.